(12) United States Patent
Okawara

(10) Patent No.: US 12,304,248 B2
(45) Date of Patent: May 20, 2025

(54) RETREAD TIRE

(71) Applicant: Sumitomo Rubber Industries, Ltd., Kobe (JP)

(72) Inventor: Renya Okawara, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/379,525

(22) Filed: Oct. 12, 2023

(65) Prior Publication Data

US 2024/0149619 A1    May 9, 2024

(30) Foreign Application Priority Data

Nov. 9, 2022   (JP) .................................. 2022-179836

(51) Int. Cl.
 *B60C 11/01* (2006.01)
 *B60C 11/02* (2006.01)

(52) U.S. Cl.
 CPC .............. *B60C 11/01* (2013.01); *B60C 11/02* (2013.01); *B60C 2011/013* (2013.01); *B60C 2200/06* (2013.01)

(58) Field of Classification Search
 CPC .... B60C 11/01; B60C 11/02; B60C 2011/013
 See application file for complete search history.

(56) References Cited

U.S. PATENT DOCUMENTS

| | | | | |
|---|---|---|---|---|
| 2011/0030862 | A1* | 2/2011 | Hayashi | .................. B60C 13/02 |
| | | | | 152/548 |
| 2017/0282650 | A1* | 10/2017 | Neuber | ................... B60C 11/01 |

FOREIGN PATENT DOCUMENTS

| | | | |
|---|---|---|---|
| CN | 109318658 A | | 2/2019 |
| JP | 06-191225 A | * | 7/1994 |
| JP | 2001-001719 A | * | 1/2001 |
| JP | 2004-098953 A | * | 4/2004 |
| JP | 2005-306258 A | * | 11/2005 |
| JP | 2009-298184 A | | 12/2009 |
| JP | 2011-235783 A | | 11/2011 |

OTHER PUBLICATIONS

Machine translation for Japan 06-191225 (Year: 2024).*
Machine translation for Japan 2001-001719 (Year: 2024).*
Machine translation for Japan 2004-098953 (Year: 2024).*
Machine translation for Japan 2005-306258 (Year: 2024).*
Extended European Search Report for European Application No. 23206701.7, dated Apr. 18, 2024.

* cited by examiner

*Primary Examiner* — Steven D Maki
(74) *Attorney, Agent, or Firm* — Birch, Stewart, Kolasch & Birch, LLP

(57) ABSTRACT

A retread tire includes a base tire, and a recapped tread adhered to the base tire. The recapped tread includes a first tread edge, and a first buttress surface extending inwardly from the first tread edge in the tire radial direction. The first buttress surface is provided with a plurality of dimples. Each of the plurality of dimples has a maximum diameter in a range from 2 to 5 mm and a maximum depth in a range from 1 to 3 mm.

20 Claims, 5 Drawing Sheets

RETREAD TIRE

RELATED APPLICATIONS

This application claims the benefit of foreign priority to Japanese Patent Application No. JP2022-179836, filed Nov. 9, 2022, which is incorporated by reference in its entirety.

FIELD OF THE DISCLOSURE

The present disclosure relates to a retread tire.

BACKGROUND OF THE DISCLOSURE

In the following Patent document 1, a retread tire has been proposed. The retread tire includes a base tire from which the tread rubber has been removed and a recapped tread rubber adhered to the base tire.

PATENT DOCUMENT

[Patent document 1] Japanese Unexamined Patent Application Publication 2011-235783

SUMMARY OF THE DISCLOSURE

Retread tires have sometimes been damaged by the heat generated during driving, such as when the recapped tread separates from the base tire.

The present disclosure has been made in view of the above circumstances and has a main object to provide a retread tire capable of improving the durability of separation of the recapped tread from the base tire.

In one aspect of the present disclosure, a retread tire includes a base tire, and a recapped tread adhered to the base tire, wherein the recapped tread comprises a first tread edge, and a first buttress surface extending inwardly from the first tread edge in a tire radial direction, the first buttress surface is provided with a plurality of dimples, and each of the plurality of dimples has a maximum diameter in a range from 2 to 5 mm and a maximum depth in a range from 1 to 3 mm.

DETAILED DESCRIPTION OF THE DISCLOSURE

One or more embodiments of the present disclosure will be described below with reference to the drawings.

Figure 1:
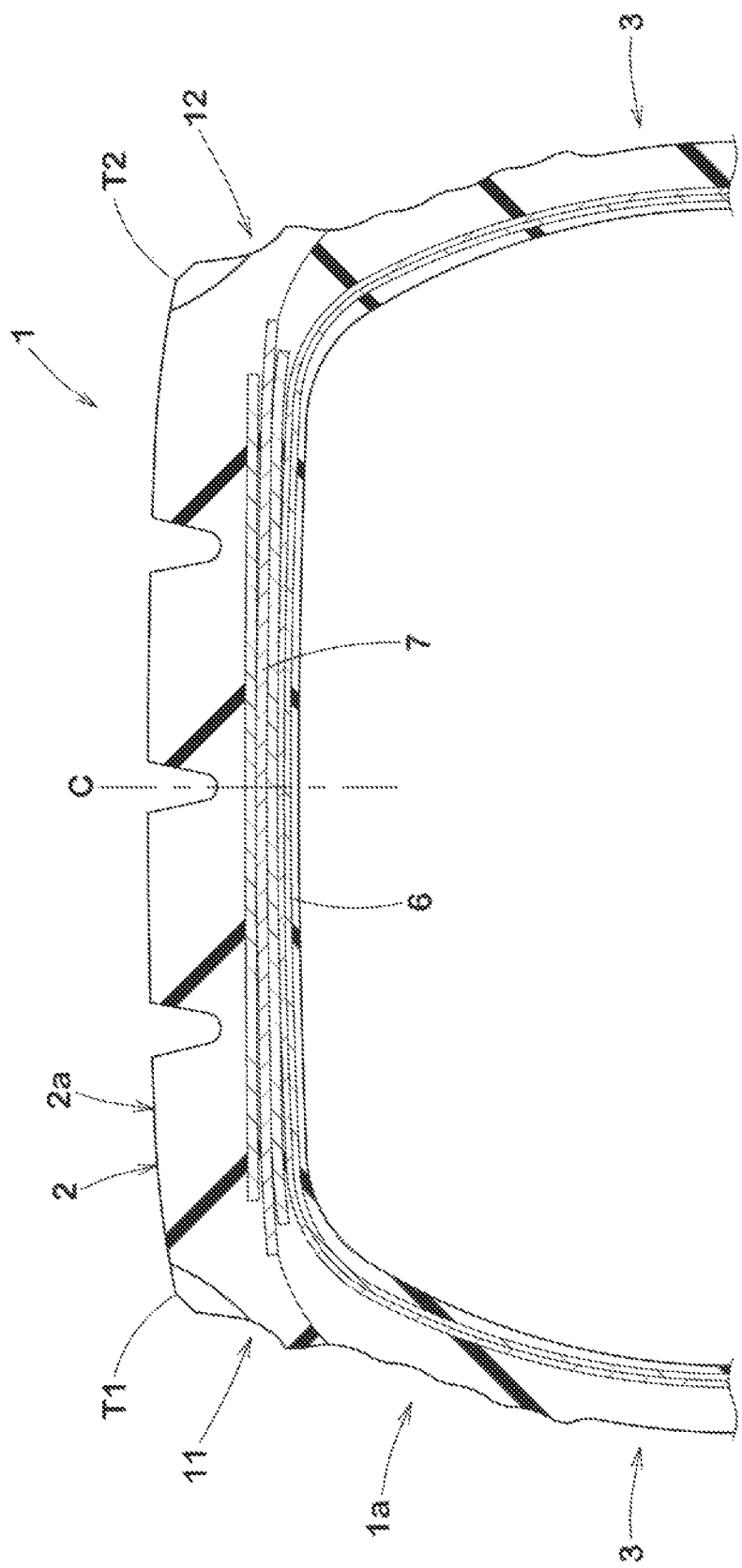
FIG. 1 is a cross-sectional view of a tire in accordance with an embodiment of the present disclosure.

FIG. 1 is a cross-sectional view of a retread tire 1 (hereinafter, it may simply be referred to as "tire") 1 according to an embodiment of the present disclosure. FIG. 1 is a cross-sectional view including the tire rotation axis under a normal state. As illustrated in FIG. 1, the tire 1 according to the present embodiment includes a base tire 1a and a recapped tread 2a adhered to the base tire 1a. The base tire 1a is obtained by removing the worn-out tread rubber from a tire that has already been used. In FIG. 1, a pair of bead portions of the base tire 1a are not illustrated. For example, the tire 1 according to the present embodiment is suitable for a heavy-duty pneumatic tire. However, the present disclosure is not limited to such an aspect.

As used herein, when a tire is a pneumatic tire based on a standard, the "normal state" is such that the tire 1 is mounted onto a standard wheel rim with a standard pressure but loaded with no tire load. In the case of tires not specified in the various standards, the normal state means the standard condition of use for the intended use of the tire, unmounted and unloaded on the vehicle. As used herein, unless otherwise noted, dimensions of portions of the tire are values measured under the normal state.

As used herein, the "standard wheel rim" is a wheel rim officially approved for each tire by the standard organization on which the tire is based, where the standard wheel rim is the "standard rim" specified in JATMA, the "Design Rim" in TRA, and the "Measuring Rim" in ETRTO, for example.

As used herein, the "standard pressure" is a standard pressure officially approved for each tire by the standard organization on which the tire is based, where the standard pressure is the "maximum air pressure" in JATMA, the maximum pressure given in the "Tire Load Limits at Various Cold Inflation Pressures" table in TRA, and the "Inflation Pressure" in ETRTO, for example.

The tire 1 includes a tread portion 2 including the recapped tread 2a, a pair of sidewall portions 3, and a pair of bead portions (not illustrated). Each of the pair of sidewall portions 3 extends in the tire radial direction and is connected to a respective one of outer ends in the tire axial direction of the tread portion 2. Each of the pair of bead portions is connected to a respective one of the pair of sidewall portions 3. In addition, the tire 1 includes a carcass 6 and a tread reinforcing layer 7 and the like, which are well-known structures and are not described here.

The recapped tread 2a includes a first tread edge T1 and the second tread edge T2. The first tread edge T1 and the second tread edge T2 are the axial outermost edges of the ground contacting patch of the tire 1 which occurs under the condition that the tire 1 is placed on a plane under the normal state at zero camber angles and loaded with 85% of the standard tire load.

As used herein, when a tire is a pneumatic tire based on a standard, the "standard tire load" is a tire load officially approved for each tire by the standard organization in which the tire is based, where the standard tire load is the "maximum load capacity" in JATMA, the maximum value given in the above-mentioned table in TRA, and the "Load Capacity" in ETRTO, for example. In the case of tires for which no standards are specified, the "standard tire load" is the maximum load that can be applied to the tire in accordance with the above-mentioned standards.

The recapped tread 2a includes a first buttress surface 11 extending inwardly from the first tread edge T1 in the tire radial direction and a second buttress surface 12 extending inwardly from the second tread edge T2 in the tire radial direction. The first buttress surface 11 will be taken as an example to explain the present disclosure, while the second buttress surface 12 may have substantially the same configuration as the first buttress surface 11.

Figure 2:
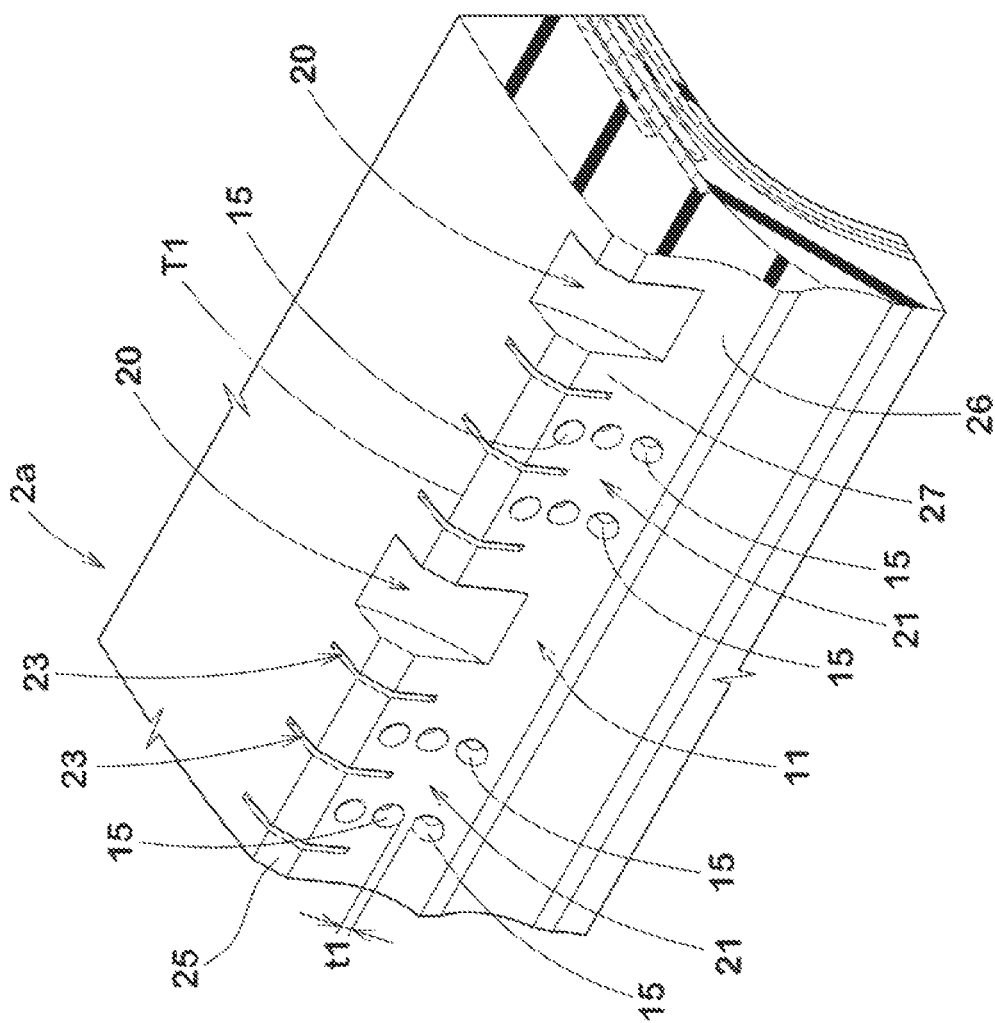
FIG. 2 is an enlarged perspective view of a first buttress surface of FIG. 1.
Figure 3:
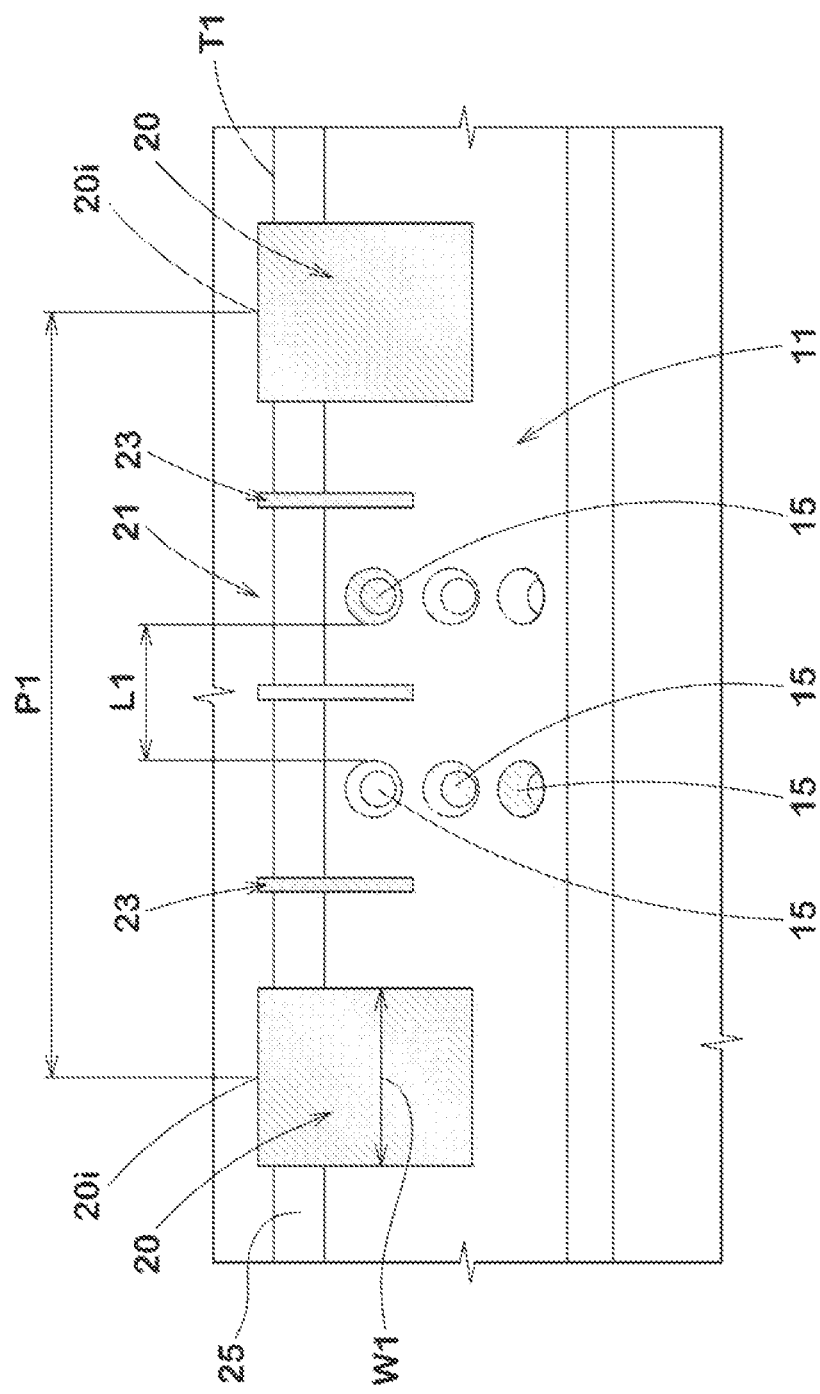
FIG. 3 is an enlarged plan view of the first buttress surface of FIG. 2.

FIG. 2 illustrates an enlarged view of the first buttress surface 11. FIG. 3 illustrates an enlarged plan view of the first buttress surface 11. In FIG. 3, the grooves and other concave areas are dotted. As illustrated in FIG. 2 and FIG.

3, the first buttress surface 11 is provided with a plurality of dimples 15. The term "dimple 15" means a localized small-sized recess.

Figure 4:
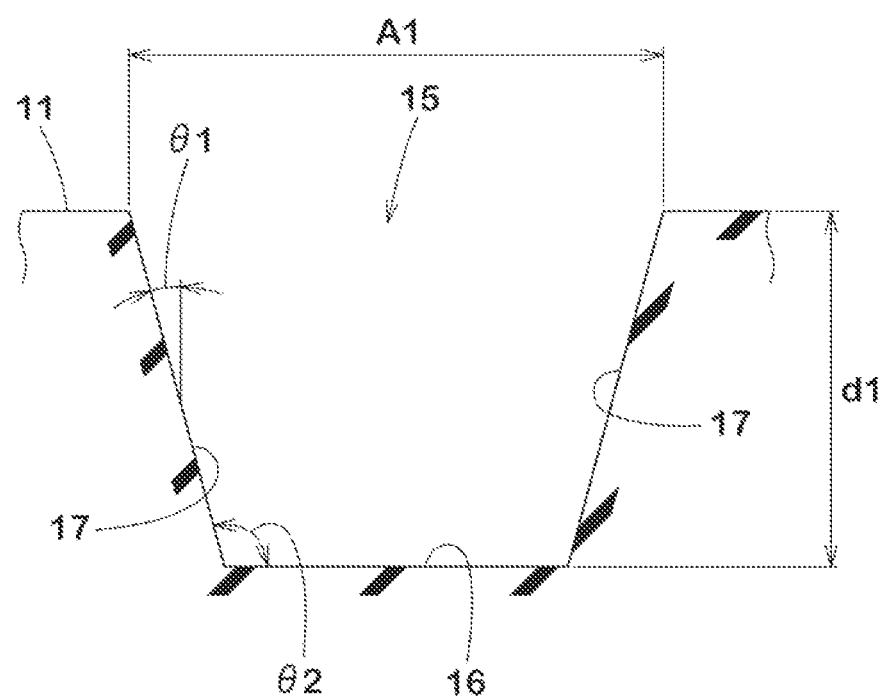
FIG. 4 is a cross-sectional view of a dimple of FIG. 2.

FIG. 4 illustrates a cross-sectional view of one of the dimples 15. As illustrated in FIG. 4, in the present disclosure, each of the plurality of dimples 15 has a maximum diameter A1 in a range from 2 to 5 mm and a maximum depth dl in a range from 1 to 3 mm. The tire a according to the present disclosure can improve the durability of separation of the recapped tread 2a from the base tire 1a by adopting the above configuration. The reasons areas follows.

In general, retread tires are sometimes damaged such that the recapped treads are separated from the base tires due to the heat generated near the buttress surfaces during driving. In the present disclosure, by providing a plurality of dimples 15 on the first buttress surface 11, the rubber volume of the recapped tread 2a can be reduced and the heat generation can be suppressed. In addition, the dimples 15 can improve the heat dissipation of the first buttress surface 11 and can increase the durability of separation. Furthermore, by specifying the dimensions of the dimples 15 as described above, it is possible to effectively suppress the cracking of the first buttress surface 11 starting from the dimples 15, while demonstrating excellent heat dissipation.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

As illustrated in FIG. 2, from the viewpoint of improving the heat dissipation of the first buttress surface 11, it is preferable that a radial length from the ground contacting surface of the recapped tread 2a to the dimples 15 on the most inner side in the tire radial direction is equal to or less than 30% of the total radial height of the tire (not illustrated), more preferably equal to or less than 10%. In addition, as illustrated in FIG. 2 and FIG. 3, the opening shape of the dimples 15 is, for example, circular. The dimples 15 are circular in shape and extend in the direction of their depth maintaining this opening shape. This makes the inner spaces defined by the dimples 15 to be columnar or conical. However, the present disclosure is not limited to such a shape, and the opening shape of the dimples 15 may be, for example, an ellipse, a triangle, a rectangle, and so on.

As illustrated in FIG. 4, the maximum diameter A1 of the dimples 15 is preferably in a range from 2.5 to 4.5 mm. In addition, the maximum depth dl of the dimples 15 is preferably in a range from 1.5 to 2.5 mm. Furthermore, the dimples 15 are depressed from the first buttress surface 11 with a taper angle θ1 equal to or less than 30 degrees. The taper angle θ1 is more preferably in a range from 10 to 20 degrees. This allows a larger volume of each dimple 15 and further improves the heat dissipation.

For example, each of the dimples 15 includes a bottom surface 16 extending along the first buttress surface 11. In some preferred embodiments, each bottom surface 16 extends parallel to the first buttress surface 11. This results in an angle θ2 between the bottom surface 16 and the inner wall 17 of the dimple 15 of from 90 to 120 degrees. Such a dimple 15 has better heat dissipation at the bottom surface 16, which can further improve the durability of separation.

As illustrated in FIG. 2, the recapped tread 2a according to the present embodiment includes a plurality of shoulder lateral grooves 20 opening at the first buttress surface 11. The first buttress surface 11 is divided into a plurality of areas 21 by the plurality of shoulder lateral grooves 20. Each of the areas 21 has 2 to 4 dimples 15 arranged in the tire radial direction. These dimples 15 are placed, for example, at intervals t1 (the distance along the first buttress surface 11) of 2 to 5 mm. Such an arrangement of the dimples 15 can improve the durability of separation while suppressing the cracking of the first buttress surface 11.

From the same point of view, each of the areas 21 has 2 to 4 dimples arranged in the tire circumferential direction. As illustrated in FIG. 3, the distance LI in the tire circumferential direction between two adjacent dimples 15 is preferably in a range from 10% to 25% of one pitch length P1 of the shoulder lateral grooves 20. The pitch length P1 corresponds to the distance in the tire circumferential direction from the inner edge 20i of one of the shoulder lateral grooves 20 in the tire axial direction to the inner edge 20i of the shoulder lateral grooves 20 adjacent thereto.

In some preferred embodiments, in the multiple dimples 15 arranged in the tire radial direction, the maximum depths dl (shown in FIG. 4) are preferably larger for the dimples on the inside of the tire radial direction. This can improve the durability of separation while improving the wear resistance around the first tread edge T1.

In the present embodiment, in each of the areas 21 of the first buttress surface 11, the number and arrangement of the dimples 15 are the same as each other. This can improve the durability of the first buttress surface 11 and the uniformity of the tire.

In the first buttress surface 11, a groove width W1 of the shoulder lateral grooves 20 is preferably in a range from 18% to 28% of the pitch length P1 of the shoulder lateral grooves 20. This can further improve the heat dissipation at the first buttress surface 11. The groove width W1 means the average groove width and corresponds to the value obtained by dividing the opening area of the shoulder lateral grooves by their length. Preferably, the shoulder lateral grooves 20 according to the present embodiment extend with a constant groove width W1.

As illustrated in FIG. 2 and FIG. 3, a plurality of shoulder narrow grooves 23 are provided between two shoulder lateral grooves 20. The shoulder narrow grooves 23 extend from the ground contacting surface of the recapped tread 2a to the first buttress surface 11. The groove width of the shoulder narrow grooves 23 is, for example, equal to or less than 10% of the groove width of the shoulder lateral grooves 20. In a plan view of the first buttress surface 11 as illustrated in FIG. 3, the hypothetical area (not illustrated) that is an extended area in the tire circumferential direction of the radially outermost dimple preferably overlaps with the shoulder narrow grooves 23. Thus, the heat dissipation of the first buttress surface 11 can be further improved.

Figure 5:
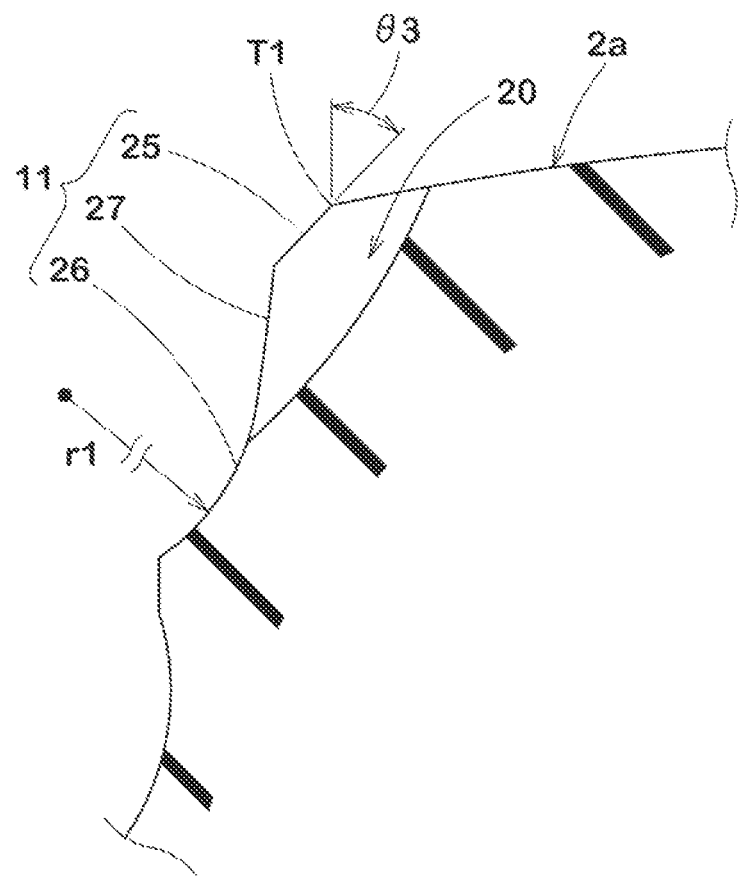
FIG. 5 is an enlarged cross-sectional view of the first buttress surface of FIG. 2.

FIG. 5 illustrates an enlarged cross-sectional view of the first buttress surface 11. As illustrated in FIG. 5, in a cross-sectional view including the tire rotation axis of the recapped tread 2a, the first buttress surface 11 includes an inclined surface 25 extending from the first tread edge T1 and a concave arc surface 26 arranged inwardly of the inclined surface 25 in the tire radial direction.

The inclined surface 25 is the plane that slopes inwardly in the tire radial direction from the first tread edge T1 toward the outside in the tire axial direction. An angle θ3 of the inclined surface 25 with respect to the tire radial direction is, for example, in a range from 40 to 50 degrees. Also, as illustrated in FIG. 2 and FIG. 3, the dimples 15 are not located on the inclined surface 25. This can prevent cracking around the dimples 15.

As illustrated in FIG. 5, the concave arc surface 26 is concave toward the tire equator C (shown in FIG. 1) and curved into an arc in its cross section. Such a concave arc surface 26 can effectively suppress the heating of the first buttress surface 11. In this embodiment, a small plane area 27 is included between the inclined surface 25 and the concave arc surface 26. As illustrated in FIG. 2, the dimples 15 described above are located on the plane area 27 and the concave arc surface 26. However, the concave arc surface 26 is not limited to such an arrangement and can be directly connected to the inclined surface 25, for example.

As illustrated in FIG. 5, from the viewpoint of improving the balance between the durability of the first buttress surface 11 and the durability of separation, a radius of curvature r1 of the concave arc surface 26 is preferably in a range from 90 to 170 mm.

The tire 1 according to the present disclosure may be produced by various methods. As shown in FIG. 1, the tire 1 according to the present disclosure can be produced by a method which includes, for example, joining the recapped tread 2a made of unvulcanized rubber to the base tire 1a and vulcanizing and molding to integrate with each other. In this case, the dimples 15 are preferably formed by the mold used in the vulcanization process. In another method, the tire 1 according to the present disclosure may be produced by a method including, for example, adhering a vulcanized recapped tread 2a with the dimples 15 described above to the base tire 1a, or adhering a vulcanized recapped tread 2a without the dimples 15 to the base tire 1a, and then forming the dimples 15 on the recapped tread 2a.

Although one or more embodiments of the tire according to the present disclosure has been described in detail above, the present disclosure is not limited to the above specific embodiments, but may be modified and embodied in various ways.

EXAMPLE

Retread tires of size 205/85R16 with the basic structure shown in FIG. 1 to FIG. 5 were prototyped according to the specifications shown in Table 1. As a comparative example 1, a retread tire without dimples was produced. As Comparative Example 2, a retread tire with dimples whose maximum diameter and depth are out of the range of the present disclosure was produced. Comparative Examples 1 and 2 are substantially the same as the tires in Examples except for the above-mentioned items. Each test tire was tested for the durability of separation of the recapped tread and other damage. The common specifications and test methods for each test tire are as follows.

Rim size: 16×5.5J
Tire inner pressure: 600 kPa
Durability of Separation Test:

Each test tire was placed on a drum tester and run with a vertical load of 16.79 kN at a speed of 80 km/h, and then the running distance when the recapped tread separated from the base tire was measured. The test results are expressed as an index, where the running distance in Comparative Example 1 is 100, and the higher the number, the better the durability of separation.

Presence of Other Damage Test:

After completing the durability of separation test described above, the first buttress surface was visually checked for any other damage and rated as either A or B below.

A: No damage has occurred on the first buttress surface.
B: The first buttress surface is cracked starting from some dimples.

The test results are shown in Table 1.

TABLE 1

|  | Comparative example 1 | Comparative example 2 | Ex. 1 | Ex. 2 | Ex. 3 | Ex. 4 | Ex. 5 |
| --- | --- | --- | --- | --- | --- | --- | --- |
| Presence or absence of dimples | absence | presence | presence | presence | presence | presence | presence |
| Maximum dimple diameter A1 (mm) | — | 6.0 | 3.0 | 2.0 | 5.0 | 3.0 | 3.0 |
| Maximum dimple depth d1 (mm) | — | 4.0 | 2.0 | 1.0 | 3.0 | 2.0 | 2.0 |
| Pitches of dimples t1 (mm) | — | 3.0 | 3.0 | 2.0 | 5.0 | 3.0 | 3.0 |
| Number of dimples arranged in one area in tire radial direction | — | 3 | 3 | 3 | 3 | 2 | 5 |
| Number of dimples arranged in one area in tire circumferential direction | — | 2 | 2 | 2 | 2 | 1 | 4 |
| Durability of separation (index) | 100 | 125 | 125 | 120 | 125 | 120 | 125 |
| Presence of other damage | A | B | A | A | A | A | A |

As a result of the test, it was confirmed that the tires of Examples 1 to 5 had significantly improved durability of separation compared to Comparative Example 1, which did not have any dimples. On the other hand, in Comparative Example 2, although the durability of separation was improved, cracks starting from some dimples occurred. Thus, in Examples 1 to 5, it was confirmed that the aforementioned cracks were prevented by optimizing the dimensions of the dimples.

[Additional Note]

The present disclosure includes the following aspects.

[Disclosure 1]

A retread tire comprising:

a base tire; and a recapped tread adhered to the base tire, wherein
the recapped tread comprises a first tread edge, and a first buttress surface extending inwardly from the first tread edge in a tire radial direction,
the first buttress surface is provided with a plurality of dimples, and
each of the plurality of dimples has a maximum diameter in a range from 2 to 5 mm and a maximum depth in a range from 1 to 3 mm.

[Disclosure 2]

The retread tire according to disclosure 1, wherein
the plurality of dimples is spaced from each other at intervals from 2 to 5 mm.

[Disclosure 3]
The retread tire according to disclosure 1 or 2, wherein the plurality of dimples is depressed from the first buttress surface with a taper angle equal to or less than 30 degrees.

[Disclosure 4]
The retread tire according to any one of disclosures 1 to 3, wherein
the first buttress surface comprises a plurality of shoulder lateral grooves opening at the first buttress surface,
the first buttress surface is divided into a plurality of areas by the plurality of shoulder lateral grooves, and
each of the areas has 2 to 4 dimples arranged in the tire radial direction.

[Disclosure 5]
The retread tire according to disclosure 4, wherein
each of the areas has 2 to 4 dimples arranged in a tire circumferential direction.

[Disclosure 6]
The retread tire according to disclosure 4 or 5, wherein
in the first buttress surface, a groove width of the plurality of shoulder lateral grooves is in a range from 18% to 28% of a pitch length of the plurality of shoulder lateral grooves.

[Disclosure 7]
The retread tire according to any one of disclosures 1 to 6, wherein
in a cross-sectional view of the recapped tread including a tire rotation axis, the first buttress surface comprises a concave arc surface concave to a tire equator side.

[Disclosure 8]
The retread tire according to disclosure 7, wherein
in the cross-sectional view of the recapped tread, a radius of curvature of the concave arc surface is in a range from 90 to 170 mm.

The invention claimed is:

1. A retread tire comprising:
a base tire; and
a recapped tread adhered to the base tire, wherein
the recapped tread comprises a first tread edge, and a first buttress surface extending inwardly from the first tread edge in a tire radial direction,
the first buttress surface is provided with a plurality of dimples,
each of the plurality of dimples has a maximum diameter in a range from 2 to 5 mm and a maximum depth in a range from 1 to 3 mm,
the plurality of dimples includes a row of dimples arranged in the tire radial direction, and
in the row of dimples, the dimples closer to the inside in the tire radial direction have larger maximum depths.

2. The retread tire according to claim 1, wherein
the plurality of dimples is spaced from each other at intervals from 2 to 5 mm.

3. The retread tire according to claim 1, wherein
the plurality of dimples is depressed from the first buttress surface with a taper angle equal to or less than 30 degrees.

4. The retread tire according to claim 1, wherein
the first buttress surface comprises a plurality of shoulder lateral grooves opening at the first buttress surface,
the first buttress surface is divided into a plurality of areas by the plurality of shoulder lateral grooves, and
each of the areas has 2 to 4 dimples arranged in the tire radial direction.

5. The retread tire according to claim 4, wherein
each of the areas has 2 to 4 dimples arranged in a tire circumferential direction.

6. The retread tire according to claim 4, wherein
in the first buttress surface, a groove width of the plurality of shoulder lateral grooves is in a range from 18% to 28% of a pitch length of the plurality of shoulder lateral grooves.

7. The retread tire according to claim 4, wherein
a plurality of shoulder narrow grooves is provided between adjacent two shoulder lateral grooves of the plurality of shoulder lateral grooves, and
a groove width of the plurality of shoulder narrow grooves is equal to or less than 10% of a groove width of the plurality of shoulder lateral grooves.

8. The retread tire according to claim 7, wherein
the plurality of shoulder lateral grooves and the plurality of shoulder narrow grooves extend entirely linearly in parallel with the tire axial direction.

9. The retread tire according to claim 8, wherein
each of the areas has 6 to 20 dimples.

10. The retread tire according to claim 7, wherein
in a plan view of the first buttress surface, a hypothetical area that is an extended area in the tire circumferential direction of a radially outermost dimple of the plurality of dimples overlaps with the plurality of shoulder narrow grooves.

11. The retread tire according to claim 7, wherein
each of the areas has 6 to 20 dimples.

12. The retread tire according to claim 1, wherein
in a cross-sectional view of the recapped tread including a tire rotation axis, the first buttress surface comprises a concave arc surface concave to a tire equator side.

13. The retread tire according to claim 12, wherein
in the cross-sectional view of the recapped tread, a radius of curvature of the concave arc surface is in a range from 90 to 170 mm.

14. The retread tire according to claim 13, wherein
some of the plurality of dimples are provided on the concave arc surface.

15. The retread tire according to claim 12, wherein
some of the plurality of dimples are provided on the concave arc surface.

16. The retread tire according to claim 1, wherein
a radial length from a ground contacting surface of the recapped tread to the dimples located on the innermost side in the tire radial direction is equal to or less than 30% of a total radial height of the tire.

17. The retread tire according to claim 16, wherein
the radial length is equal to or less than 10% of the total radial height of the tire.

18. The retread tire according to claim 1, wherein
each of the plurality of dimples has a circular opening shape on a first buttress portion.

19. The retread tire according to claim 18, wherein
the maximum diameter of the plurality of dimples is in a range from 2.5 to 4.5 mm, and
the maximum depth of the plurality of dimples is in a range from 1.5 to 2.5 mm.

20. The retread tire according to claim 19, wherein
each of the plurality of dimples has a bottom surface extending in parallel with the first buttress surface.

* * * * *